United States Patent [19]

Perdue et al.

[11] Patent Number: 4,780,949

[45] Date of Patent: Nov. 1, 1988

[54] TIRE RETREADING EQUIPMENT

[75] Inventors: Thad A. Perdue; Bobby G. Johnson, both of Muscle Shoals, Ala.

[73] Assignee: Robbins Tire & Rubber Co., Inc., Tuscumbia, Ala.

[21] Appl. No.: 942,878

[22] Filed: Dec. 17, 1986

[51] Int. Cl.⁴ .................. B23P 19/00; B29C 35/00
[52] U.S. Cl. .............................. 29/525.1; 425/17; 425/23; 425/53
[58] Field of Search .............. 264/315; 29/526 R; 156/DIG. 13, 120; 425/23, 27, 33, 17, 35, 43, 45, 51, 52, 53; 152/501, 511, 512, 513, 429, 430, DIG. 10, DIG. 13

[56] References Cited

U.S. PATENT DOCUMENTS

| | | | |
|---|---|---|---|
| 1,579,717 | 4/1926 | Kuhlke | 264/315 |
| 1,628,821 | 5/1927 | Callahan | 425/45 |
| 2,272,892 | 2/1942 | Taylor et al. | 264/315 |
| 2,275,081 | 3/1942 | Maynard | 264/315 |
| 2,380,380 | 7/1945 | Bacon | 425/28 |
| 2,564,662 | 8/1951 | Baker | 425/51 |
| 3,133,317 | 5/1964 | Branick | 425/17 |

FOREIGN PATENT DOCUMENTS 1032822 6/1966 United Kingdom ............ 152/429

*Primary Examiner*—Willard E. Hoag
*Attorney, Agent, or Firm*—Stefan J. Klauber

[57] ABSTRACT

A tire retreading tube for use with a tire retreading rim formed from a pair of axially-adjacent rim sections, one of said sections having a cutout for the reception of the valve stem extending from the tube body and being formed with threads adjacent the tube. The tube is formed with an integral extension of generally cylindrical form through which the stem extends, so that the extension surrounds the portion of the stem adjacent the tube, and a nut engaging the threads on the stem and cooperating with an underlying washer is effective to pull the extension into the rim cutout and draw the tube against it.

3 Claims, 1 Drawing Sheet

TIRE RETREADING EQUIPMENT

FIELD OF THE INVENTION

This invention relates to tire retreading and is more particularly concerned with the tube or bladder used in tire retreading operations and with its cooperation with the other parts of the retreading apparatus.

BACKGROUND OF THE INVENTION

Tire retreading or "recapping" is a common, widely-used procedure, particularly in the case of truck tires, to renew the tread of tires having a sound carcess but having their tread worn relatively thin as a result of many miles of use. In conventional retreading operations, a standard method involves abrading the road-engaging portion of the tire carcass to be retreaded, wrapping an un-cured rubber strip or "cushion" around it, adhesively applying a new tread rubber strip, which normally has been partially vulcanized, over the "cushion", and then, prior to introducing the assembly into a curing chamber where vulcanization of the tread rubber is completed and the tread rubber is vulcanized to the tire carcass, the tire carcass unit is placed upon a retreading "rim" which is annular in form, generally like the periphery of the wheel the tire is mounted on during normal use, but is conventionally made up of two axially-adjacent sections which interlock with each other upon rotation of one section relatively to the other. To effect this operation, a tube or "bladder" for the reception of air or other fluid is positioned in the tire carcass and then the tire carcass is positioned on one section of the rim, with the valve stem for introduction of the fluid extending through a slot formed in the rim section. Thereupon, the other section of the rim is placed in position and the two sections are interlocked by circumferentially rotating the second section relatively to the other. However, the slot is wider than the thickness of the valve/or inlet stem and, when the two sections of the rim are being interlocked and the two are rotated circumferentially relatively to one another, the tube has not yet been inflated and the valve stem may become twisted and/or severly bent relatively to the bladder and it may break off or tear away from the bladder or develop a leak at its juncture with the bladder. This is a problem which has not been satisfactorily solved in this art and continues to be a source of concern for the retreading field.

It is accordingly an object of the present invention to provide a construction for a tube or bladder used for tire retreading which prevents damage to the valve stem during assembly of the retreading apparatus.

It is another object of the invention to provide a retreading assembly wherein the tube or bladder used for retreading cooperates with its rim in such manner that its stem is prevented from damaging movements when the apparatus is assembled.

BRIEF SUMMARY OF THE INVENTION

These and other objects of the invention are achieved by a tire retreading bladder construction wherein the retreading tube is formed with a generally-cylindrical extension which surrounds the lower portion of the valve stem adjacent its point of connection to the tube. This extension enters and fills the slot in the rim when the tire carcass to be retreaded is mounted for retreading, with the tube inside it, and the two sections of the rim are interlocked. The stem is threaded adjacent the extension and cooperates with a washer and nut which can be tighted against the rim. As a result of this cooperation between the enlargement on the tube, and the rim and the washer and nut, the stem does not bend or become exposed to damage and remains firmly in its desired position at all times.

BRIEF DESCRIPTION OF THE DRAWINGS

An illustrative embodiment of the invention is shown in the accompanying drawings wherein.

DETAILED DESCRIPTION OF THE DRAWINGS

Figure 1:
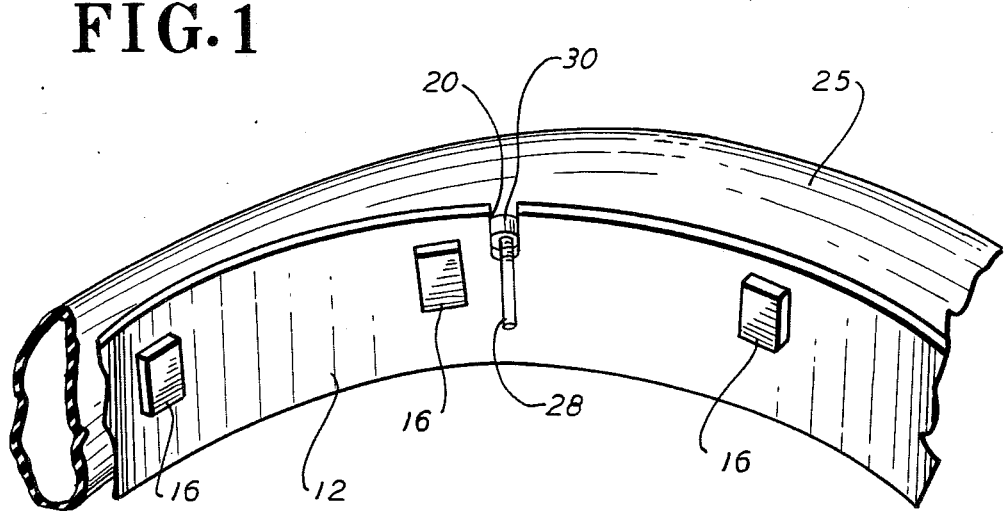
FIG. 1 is a fragmentary perspective view of the slotted portion or section of a retreading rim showing a retreading tube associated with it and embodying features of the present invention.
Figure 2:
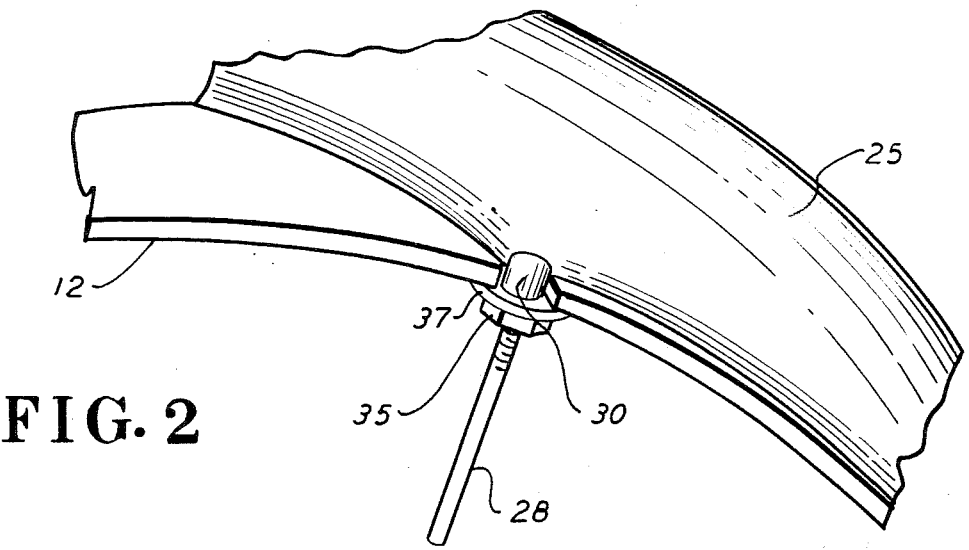
FIG. 2 is another perspective view of the assembly as seen in FIG. 1 as viewed approximately from the top.
Figure 3:
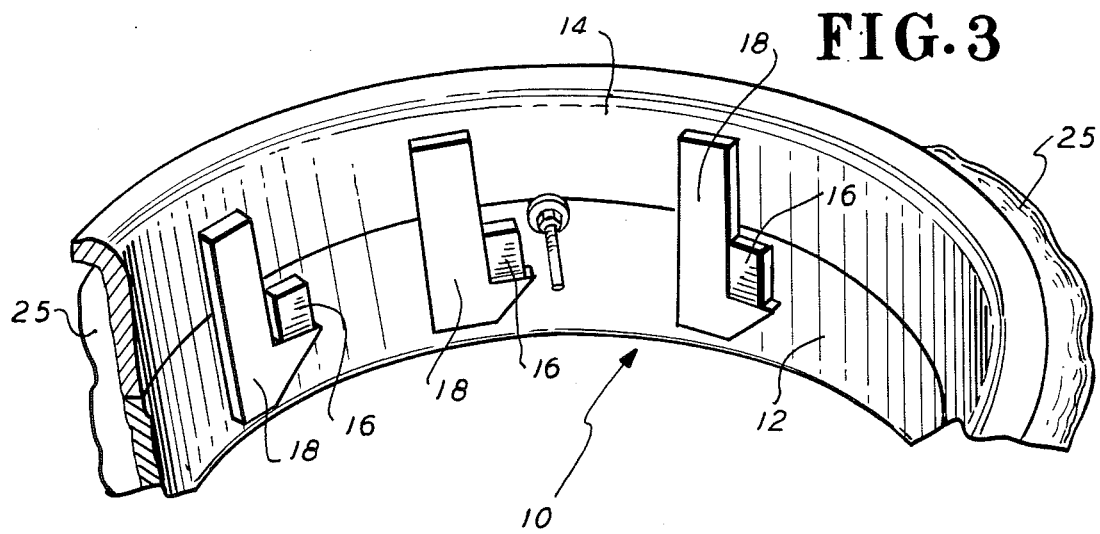
FIG. 3 is a fragmentary perspective view similar to FIG. 1 of a complete retreading rim, showing the relationship of the two rim sections with the retreading tube embodying features of the present invention.

Referring to the drawings, and particularly to FIGS. 1 and 3, the retreading rim is a substantially annular member 10 which is split circumferentially, i.e. formed from two axially-adjacent sections 12 and 14. For ease of description, the split retreading rim 10 is shown without other appendages normally carried by a conventional retreading rim but not relating to the present invention. The showing of the tire carcass, which would normally surround the tube illustrated has also been omitted. The section 12 shown in FIG. 1 has a plurality of catches 16 around its inner surface. The second rim section 14, which cooperates with rim section 12, has locking members or hooks 18 which are carried by section 14 in spaced relationship corresponding to the catches 16. When the two rim sections are interlocked by relative circumferential rotation to form the completed ring, as seen in FIG. 3, the locking members 18 engage catches 16 to hold the two sections together in a secure fashion. Rim section 12 is also formed with a slot 20, as seen in FIG. 1. Mounted upon rim 10 is a retreading tube or bladder 25 which is provided with a metal valve or inlet stem 28 which extends through slot 20. The valve stem 28 is suitably anchored in the tube body in conventional manner, e.g. by having a flared or flanged inner end embedded in the tube rubber. The tube 25, is, according to the invention, formed with an integral extension 30, which is generally cylindrical in form, and through which the valve stem 28 extends, so that the valve stem is surrounded by the extension 30 at its lower end, i.e. its end adjacent tube 25, and as a result it makes a relatively snug fit in slot 20 when the tube is mounted on the rim and the valve stem is passed through the slot 20. This will be clearly seen in FIGS. 2 and 3. The exterior of the valve stem is suitably threaded adjacent tube extension 30 for the reception of a nut 35 which is positioned to overlie a washer 37 when the assembly is completed.

In the use of the construction of the invention, the rim section 12 is placed upon a suitable supporting surface such as the floor. The tube 25 is placed in a deflated condition in the tire carcass to be retreaded. After the tire carcass has been prepared for retreading, e.g. by abrading the road-engaging portion of the carcass, wrapping an uncured rubber cushion around it, applying adhesive, and then applying a new, partially cured or vulcanized tread rubber strip. The carcass can also be prepared for conventional retreading in any other conventional manner using partially cured or uncured tread rubber. This prior preparation of the carcass forms no part of the present invention and is discussed merely for illustrative purpose. The prepared carcass and the tube 25 are then placed over the rim section 12 with the valve stem 28 of the tube 25 extending through the slot 20 and the tube extension 30 fitting snuggly in the slot. Suitably the nut 35 can be loosely threaded upon the valve stem 28 with the washer 37 underlying it, and when the carcass and tube are mounted upon rim section 12 the nut and washer are positioned on the inner side of the rim section, whereupon the nut is tightened to draw the tube against the rim section 12 and, at the same time, to securely draw the integral extension 30 on the tube into the slot 20 so that a firm mounting results with the valve stem being secured against movement relatively to the tube 25 while at the same time being centered in the slot 30 and being protected against damage by undesired contact with the surfaces of the rim section. Thereupon section 12 with the hooks 18 out of engagement with the catches 16, and in the embodiment illustrated, it is rotated clock-wise so that the hooks engage the catches and the two rim sections are interlocked for further handling. The entire assembly is then ready to be placed in a curing apparatus in conventional manner and, after the vulcanization has been completed and the parts have cooled, rim section 14 is disengaged from the rim section 12, e.g. by counter-clockwise rotation, the nut is loosened, and the carcass, retreaded tire, and the contained retreading tube are removed, the tube then being removed from the tire for re-use in another retreading operation. By reason of the construction of the invention, the tube can be used repeatedly without damage resulting from normal handling and interlocking of the rim sections.

It will be obvious that various changes and modifications can be made without departing from the scope of the invention as defined in the appended claims and it is intended, therefore, that all matter contained in the foregoing description and in the drawing shall be interpreted as illustrative only and not in any way as limitative of the invention.

We claim:

1. In combination with a tire retreading rim formed from a pair of axially-abuttable rim sections, one of which has a cut-out slot adjacent the juncture of the rim sections for reception of the valve stem of a retreading tube mounted upon said rim, a retreading tube encircling said rim, said retreading tube having a valve stem extending radially-inwardly therefrom and said tube being formed with a radially-inwardly-extending integral extension of generally cylindrical form through which said stem extends, whereby the extension surrounds the portion of the stem adjacent said tube, and said stem being threaded adjacent said extension, said extension being disposed in said cutout with the valve stem extending radially inwardly of said rim, and a washer and nut engaging said threads on said stem and effective to pull said extension radially inwardly into said cutout and draw said tube against said rim section, said sections being axially abutting and each having locking means engagable with a corresponding locking means on the other of said sections by rotation of one of said sections while said sections are substantially in mutual contact.

2. A tire retreading rim formed from a pair of axially-abuttable rim sections, one of which has a cutout slot adjacent the juncture of the rim sections for reception of the valve stem of a retreading tube mounted upon said rim, a retreading tube encircling said rim, said retreading tube having a valve stem extending radially-inwardly therefrom and said tube being formed with a radially-inwardly-extending integral extension of generally cylindrical form through which said stem extends, whereby the extension surrounds the portion of the stem adjacent said tube, and said stem being threaded adjacent said extension, said extension being shaped to be received in said cutout with the valve stem extending radially inwardly of said rim, a washer and nut engaging said threads on said stem and effective to pull said extension radially inwardly into said cutout and draw said tube against said rim section, said sections being axially abutting and each having locking means engagable with a corresponding locking means on the other of said sections by rotation of one of said sections while said sections are substantially in mutual contact.

3. A method for securing a retreading tube to a retreading rim section, said tube having a radially-inwardly-extending threaded valve stem and a body with an integral radially-inwardly extending extension surrounding said stem at its base and said rim section having a slot for reception of said stem, which comprises inserting said stem in said slot, and tightening a nut on said stem against a washer whereby to draw said extension firmly into said slot and securely anchor said retreading tube to said retreading rim said sections being axially abutting and each sharing locking means engagable with a corresponding locking means on the other of said sections by rotation of said sections while said sections are substantially in mutual contact, said method including assembling said sections about said stem and a relatively rotating said sections while in mutual contact to lock said locking means.

* * * * *